# 3,021,305
CROSS-LINKED POLYCARBONATE RESINS
Eugene P. Goldberg, Pittsfield, Mass., assignor to General Electric Company, a corporation of New York
No Drawing. Filed Aug. 22, 1957, Ser. No. 679,744
4 Claims. (Cl. 260—47)

This invention relates to polycarbonate resins having desirable physical, chemical and electrical properties and to their preparation. More particularly, it relates to the cross-linking of polycarbonate compositions containing as a constituent part thereof dihydric phenol derived carbonate units in which the carbonate group is directly attached to a nuclear carbon atom, i.e., to a carbon of an aromatic ring.

Various types of polycarbonate resins are known, among which are those prepared by the vinyl polymerization of unsaturated carbonate esters such as allyl carbonate, etc., from the ester interchange of carbonate esters with glycols and by the reaction of dihydroxy-monoaryl compounds such as hydroquinone and resorcinol with phosgene or carbonate esters. Such polycarbonate materials are of limited usefulness because they do not have a desirable combination of physical properties. More useful are those polycarbonate resins which contain carbonate units derived from dihydric phenols and copolymers of such carbonate resins with other materials. While such compositions are characterized by good physical, chemical and electrical properties, and have a relatively high softening point as well as desirable tensile strength, impact strength, and even rubber-like elastic properties, they are quite readily soluble in certain organic solvents such as dioxane, chloroform, methylene chloride and chlorobenzene among others, so that their final use is limited to those applications in which they do not come in contact with such organic solvents. Furthermore, while their softening point is generally of the order of about 150° C., they are still thermoplastic and, as such, are not suitable for uses such as in electrical equipment and other applications where temperatures in excess of 150° C. are encountered.

Briefly stated, the compositions of this invention comprise carbonate polymers or resins containing structural units derived from dihydric phenols, the resins being cross-linked by means of heating under oxidizing conditions such as in an air circulating oven or in the presence of oxygen or an oxidizing agent at temperatures of from about 200° C. to 600° C. The resultant tough resinous materials will not melt even at 300–400° C. In addition, the cross-linked polycarbonates are insoluble in the usual solvents and show outstanding resistance to chemical and solvent attack even at elevated temperatures.

All dihydric phenol derived polycarbonates including copolymers are useful in the practice of the invention. The dihydric phenol compounds used in connection with the invention can typically be represented by the general formula:

(I) 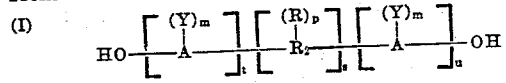

where R is hydrogen or a monovalent hydrocarbon radical, for example alkyl radicals (e.g. methyl, ethyl, propyl, isopropyl, butyl, decyl, etc.), aryl radicals (e.g. phenyl, naphthyl, biphenyl, etc.), aralkyl radicals (e.g. benzyl, ethylphenyl, etc.), cycloaliphatic radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene residue such as methylene, ethylene, propylene, propylidine, isopropylidene, butylene, butylidene, isobutylidene, amylene, isoamylene, amylidene, isoamylidene, etc. $R_2$ can be a polyalkoxy linkage, such as polyethoxy, polypropoxy, polythioethoxy, polybutoxy, polyphenylethoxy, or a silicon containing linkage for example polydimethylsiloxy, polydiphenylsiloxy, polymethylphenylsiloxy, etc. $R_2$ can also consist of two or more alkylene or alkylidene groups such as above, separated by the residue of an aromatic nucleus, by a tertiary amino group, by an ether linkage or by a carbonyl group, by a silicone containing linkage or by a sulfur-containing group such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals and (c) organic radicals, (a), (b) and (c) being inert to and unaffected by the reactants and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on $R_2$, s ranges from zero to 1, t and u are whole numbers including zero. When s is zero, however, either t or u may be zero and not both.

In the dihydric phenol compound, the substituent Y may be the same or different as may be the R. Among the substituents represented by Y are halogen, e.g., chlorine, bromine, fluorine, etc., or oxy radicals of the formula OW, where W is a monovalent hydrocarbon radical similar to R, or monovalent hydrocarbon radicals of the type represented by R. Other inert substituents such as a nitro group can be represented by Y. Where s is zero in Formula II, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A);
2,4'-dihydroxydiphenyl methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl;

2,4'-dihydroxydiphenyl; dihydroxynaphthalenes such as 2,6-dihydroxynaphthalene, etc. Dihydroxy aryl sulfones such as those set forth in application Serial No. 613,817, filed October 4, 1956, assigned to the same assignee as this invention are also useful, e.g., bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4,4'-dihydroxydiphenyl sulfone; bis-(4-hydroxy phenyl) biphenyl disulfone, etc. The preparation of these and other useful sulfones is described in Patent 2,288,282—Huissmann. Polysulfones as well as substituted sulfones using halogen, nitrogen, alkyl radicals, etc. are also useful. Dihydroxy aromatic ethers such as those set forth in application Serial No. 598,768, filed July 19, 1955, assigned to the same assignee as this invention are also useful. Methods of preparing such materials are found in "Chemical Reviews" 38, 414–417 (1946), and Patent 2,739,171—Linn. Exemplary of such dihydroxy aromatic ethers are p,p'-dihydroxydiphenyl ether;
p,p'-dihydroxytriphenyl ether;
the 4,3'-, 4,2'-, 4,1'-, 2,2'-, 2,3'-, etc. dihydroxydiphenyl ethers;
4,4'-dihydroxy-2,6'-dimethyldiphenyl ether;
4,4'-dihydroxy-2,5-dimethyldiphenyl ether;
4,4'-dihydroxy-3,3'-diisobutyl-diphenyl ether;
4,4'-dihydroxy-3,3'-diisopropyl-diphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether,
4,4'-dihydroxy-2,5-diethoxydiphenyl ether, etc.

Mixtures of the dihydric phenols can also be employed and where dihydric phenol is mentioned herein, mixtures of such materials are considered to be included.

When a carbonate ester is used for the preparation of the polycarbonates, the materials are reacted at temperatures of from about 150° C. to 300° C. or higher for times varying from 1 to 15 or more hours. Under such conditions, an ester interchange occurs between the carbonate ester and the dihydroxy compound. The ester interchange is advantageously carried out at reduced pressures of around 10 to 100 mm. of mercury, preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' "Unit Processes in Organic Synthesis" (4th Edition McGraw-Hill Book Company, 1952), pages 616 to 620. The amount of such catalyst is usually quite small and is of the order of 0.001 to 0.1% by weight, based on the total weight of the reactants.

The diaryl carbonates useful in this connection can be represented by the general formula:

(II)       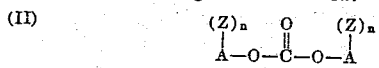

where A is an organic residue in the same sense as in Formula I, Z is an organic or inorganic radical in the same sense as Y of Formula I, and $n$ is an integer. Examples of carbonate esters comprise symmetrical carbonates, for example diphenyl carbonate, di-(halo-phenyl) carbonates, e.g., di-(chlorophenyl) carbonate, di-(bromophenyl) carbonate; di-(polyhalophenyl) carbonates; e.g. di-(trichlorophenyl) carbonate, di-(tribromophenyl) carbonate, etc.; di-(alkylphenyl) carbonates, e.g. di-(tolyl) carbonate, etc. di-(naphthyl) carbonate, di-(chloronaphthyl) carbonate, etc.; unsymmetrical carbonates, for example phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 371 (1916), and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

The polycarbonates may also be prepared using phosgene or phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example, from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 moles or more may be employed. Other methods for the preparation of polycarbonates are set forth in the below referenced applications.

Suitable phosgene-like dibasic acid halides, in addition to phosgene, include, for example, dibromo and diiodocarbonyls as well as the bishaloformates of dihydric phenols (e.g., bischloroformates of hydroquinone, bisphenol-A, etc.) or glycols (e.g., bischloroformates of ethylene glycol, neopentyl glycol, etc.). Other carbonate precursors will occur to those skilled in the art.

It will be seen that whether a carbonate ester or phosgene is used in the reaction, the dihydric phenol will produce a dihydric phenol carbonate structural unit which can typically be represented by the following general formula wherein the various letters have the same meaning as above.

(III)      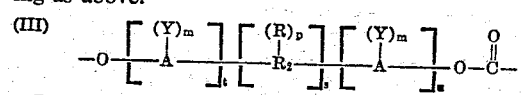

In addition to the polymers described above, copolymers containing carbonate units are also susceptible to cross-linking by means of heating. Such copolymer compositions are described, for example, in copending application Serial No. 638,239, filed February 5, 1957, assigned to the same assignee as the present application, said copending application being included herein by reference. Other materials which are susceptible to treatment according to this invention are polycarbonate copolymers of dihydric phenols and sulfones as disclosed in copending application Serial No. 679,745, filed August 22, 1957, copolymers of dihydric phenols and aromatic ethers as disclosed in copending application Serial No. 679,746, filed August 22, 1957, and copolymers of dihydric phenols and dibasic acids as disclosed in copending application Serial No. 679,743, filed August 22, 1957, all of the above copending applications being assigned to the same assignee as this invention and incorporated herein by reference. In general, it has now been found that heating the polycarbonate material at a temperature of from about 200° C. to about 600° C. preferably at ca. 350–500° C. for varying periods of time depending upon the particular polycarbonate resin used will effectively cross-link the polycarbonate resin so that it is rendered insoluble in the usual organic solvents and is infusible at high temperatures.

The following examples will illustrate the practice of the invention and are not to be taken as limiting in any respect. All intrinsic viscosities were determined in dioxane at 30.3° C.

Example 1

The polycarbonate resin used in this example was prepared by adding to a reaction vessel 45.7 g. (0.2 mol) bisphenol-A and 468 cc. of dry pyridine. A total quantity of 22.6 g. of phosgene was introduced to the reaction vessel by bubbling through the reactants at a temperature of 30° to 33° C. at a rate of 0.4 to 0.6 gram per minute. The resulting polymer was precipitated and washed with isopropanol and had an intrinsic viscosity of 0.99. The resulting polycarbonate resin was dissolved in chloroform and films 5 to 7 mils thick cast therefrom. These films were subsequently aged at 225 to 230° C. in an air circulating oven. After 5 hours, one sample of film was removed from the oven and treated with boiling dioxane. The resin was soluble. After 27 hours, another sample was removed from the oven and this, too, was soluble in boiling dioxane. Another sample was removed from the oven after 48 hours of heating. When treated with boiling dioxane, some insoluble gel remained, showing that a certain amount of cross-linking did take place. After 144 hours, a film treated with boiling dioxane was insoluble, showing that extensive cross-linking had taken place.

Example 2

The resin used in this example was prepared by the method of Example 1, using 380 lbs. of methylene chloride, 30 lbs. of dry pyridine, 30 lbs. of bisphenol-A, 13.5 lbs. of phosgene and 42 grams of phenol. The product had an intrinsic viscosity of 0.85. A portion of the above resin was treated on a hot plate at 380° C. It was found that in 20 to 30 seconds, the material had become so cross-linked that it was insoluble in hot chloroform. Another portion of the above resin was treated at a temperature of 340° C. It was found that after 30 seconds, the heat-treated material was only partially soluble, indicating that some cross-linking had taken place. When heated for 60 to 80 seconds at 340° C., the material was insoluble in hot chloroform.

Still another portion of the above resin was treated at a temperature of 320° C. After 60 seconds, the material was soluble in hot chloroform. After heat treatment at 320° C. for 150 seconds, the material was only partially soluble in hot chloroform, indicating that some cross-linking had taken place. After 300 seconds treatment at 320° C., the material was insoluble in hot chloroform, indicating considerable cross linking.

A part of the resin of Example 2 was dissolved to about 10% by weight solids content in methylene chloride. A rectangular copper wire ¼" by ³⁄₃₂" in diameter was dip coated with this material, and placed in a furnace at about 600° F. for 30 seconds, withdrawn from the furnace, and replaced therein for another 30 seconds, for a total residence time of 3 minutes. The coated wire was then inserted into a furnace at 500 to 550° C. for one minute, withdrawn and replaced therein for 2 minutes more. The resultant coating on the wire was clear, yellow, tough and flexible. It did not dissolve in boiling chloroform.

Another portion of the resin of Example 2 above was dissolved in a 1:2 chlorobenzene-cyclohexanone mixture for a total solids content of 14% by weight, and used to dip coat a ¼" x ³⁄₃₂" rectangular copper wire, the wire being passed after dipping through induction heaters to remove solvent and cure the resin. A residence time of 20 seconds in an induction coil producing a wire temperature of about 400 to 500° C. was sufficient to cure a 1.5 mil coating. The resulting coating had good appearance and good adhesion to the copper. For portions of the coating which were only 0.1 mil thick, a dielectric strength of about 5000 volts per mil at room temperature was obtained. The coating furthermore exhibited excellent resistance to ASTM #3 oil, which is a swelling oil, and to #1467 pyranol at 150° C. The 1467 pyranol consists of 60% by weight of hexachlorodiphenyl and 40% trichlorobenzene. Samples of the uncured polycarbonate resin swelled and dissolved readily in the pyranol at 150° C.

Example 3

The polycarbonate material used in this example was prepared as in Example 1 using 10 g. of p,p'-dihydroxydiphenyl ether, 100 g. of pyridine and a slight molar excess of phosgene. The polymer, precipitated with hexane and washed with methanol, had an intrinsic viscosity of 0.28.

The poly-(p,p'-dihydroxydiphenyl ether carbonate) was readily soluble in chloroform. However, when stroked on a hot plate for 30 seconds at about 380° C., it cured to an infusible resin, which insoluble in chloroform.

Example 4

The poly-(2,2-bis-[p-hydroxyphenyl]-butane carbonate) of this example was prepared as in Example 1 using 6.0 g. of 2,2-bis-(p-hydroxyphenyl)-butane, 4.12 g. of pyridine, 60 cc. of chlorobenzene and 2.46 g. of phosgene. The polymer, precipitated with hexane, had an intrinsic viscosity of 0.50.

The polycarbonate prepared as above was soluble in chloroform. However, when the material was stroke-cured on a hot plate maintained at about 380° C., a product which was insoluble in boiling chloroform was obtained in 30 seconds.

Example 5

The poly-(bisphenol-A-50 weight percent 2,2-bis-[3-methyl-4-hydroxyphenyl]-propane carbonate) of this example was prepared as in Example 1 using 50.0 g. of bisphenol-A, 50.0 g. of 2,2-bis-(3-methyl-4-hydroxyphenyl)-propane, 700 cc. of pyridine and 47.2 g. of phosgene. The polymer was precipitated with isopropanol and had an intrinsic viscosity of 0.79.

The material prepared as above was soluble in chloroform. However, when it was stroke-cured on a hot plate at 380° C., a material which was insoluble in boiling chloroform was obtained in about 5 seconds.

Example 6

The material of this example, poly-(bisphenol-A-20 mol percent p,p'-dihydroxydiphenyl sulfone carbonate), was prepared as in Example 1 using 4.56 g. of bisphenol-A, 1.25 g. of p,p'-dihydroxydiphenyl sulfone, 50 cc. of pyridine and a slight molar excess of phosgene. The copolymer was precipitated and washed with isopropanol, and had an intrinsic viscosity of 0.79.

The polymer prepared as above was soluble in chloroform. However, when the material was stroke-cured on a hot plate maintained at about 380° C., cross-linking to a state where the material was insoluble even in boiling chloroform was achieved in about 40 seconds.

*Example 7*

A poly-(bisphenol-A carbonate) was prepared by the reaction of 913 g. of bisphenol-A with 1029 g. of diphenyl carbonate using 0.52 g. calcium carbonate as a catalyst. Phenol was evolved at 200–300° C. and 1–20 mm. pressure. The melt cooled to a clear, brittle, solid polymer of relatively low molecular weight. This resin was soluble in dioxane. It was cured to an infusible, insoluble material by heating on a hot plate for 60 seconds at 370° C. At 340° C., the time required to effect a cure was 210 seconds.

Polycarbonates derived from dihydric phenols lend themselves in a unique way to this thermal-oxidative crosslinking process by virtue of a combination of outstanding thermal stability and the proper chemical reactivtiy. Thus, the polycarbonates suffer little degradation during the course of the elevated temperature treatment. The cross-linked resins, as a consequence, retain many of the desirable attributes of the parent polymers such as strength, toughness, flexibility and good electrical properties, etc.

The materials of this invention are useful in applications where a tough, flexible coating or film is required for protecting or insulating a base material. Thus, they are particularly useful as insulating wire coatings, the polycarbonate material being dissolved in a suitable solvent such as chloroform through which the wire is passed and then heated to remove the solvent and cure the film, leaving a firm, flexible, high-temperature-resistant coating on the wire. Films of polycarbonate material heat treated as above are useful for wrapping or packaging materials, as liners, containers, covers, closures and sound-recording and other types of tapes. Fibers formed from the material and so treated are useful for yarn, thread, bristles, rope, etc. The products of the invention are further useful for laminating adhesives and as adhesives for other applications. The compositions can be alloyed with other resinous materials in their uncured state and readily mixed with pigments, stabilizers, plasticizers, etc.

What I claim as new and desire to secure by Letters Patent of the United States is:

1. The method for cross-linking a linear, high molecular weight, carbonate polymer comprising the reaction product of a dihydric phenol in which the hydroxyl groups are the sole reactive groups, and a carbonate precursor selected from the class consisting of carbonate esters, carbonyl halides and haloformates of dihydric phenols, said method comprising heating said linear polymer in the presence of oxygen at a temperature of from 200° to 600° C. for a period of time, varying inversely with the temperature, from a few seconds to more than an hour, to render said polymer insoluble in a solvent selected from the group consisting of dioxane and chloroform.

2. An infusible, resinous material comprising the cross-linked reaction product of a dihydric phenol in which the hydroxyl groups are the sole reactive groups, and a carbonate precursor selected from the class consisting of carbonate esters, carbonyl halides and haloformates of dihydric phenols, said material being cross-linked by heating in the presence of oxygen at a temperature of from 200° to 600° C. for a period of time, varying inversely with the temperature, from a few seconds to more than an hour, to render it insoluble in a solvent selected from the group consisting of dioxane and chloroform.

3. An infusible, resinous material comprising the cross-linked reaction product of 2,2-bis-(4-hydroxyphenyl)-propane and phosgene, said material being cross-linked by heating in the presence of oxygen at a temperature of from 200° to 600° C. for a period of time, varying inversely with the temperature, from a few seconds to more than an hour, to render it insoluble in a solvent selected from the group consisting of dioxane and chloroform.

4. The method for cross-linking a linear, high molecular weight, carbonate polymer comprising the reaction product of 2,2-bis-(4-hydroxyphenyl)propane and phosgene, said method comprising heating said linear polymer in the presence of oxygen at a temperature of from 200° to 600° C. for a period of time, varying inversely with the temperature, from a few seconds to more than an hour, to render said polymer insoluble in a solvent selected from the group consisting of dioxane and chloroform.

References Cited in the file of this patent

FOREIGN PATENTS 546,376   Belgium _____ Mar. 23, 1956

OTHER REFERENCES

Schnell: Ger. application F 13,040 (KL 39c Gr. 16), printed June 21, 1956.

Schnell: Ang. Chem. 68, 633–640 (1956). Copy Library.